Figure 1:
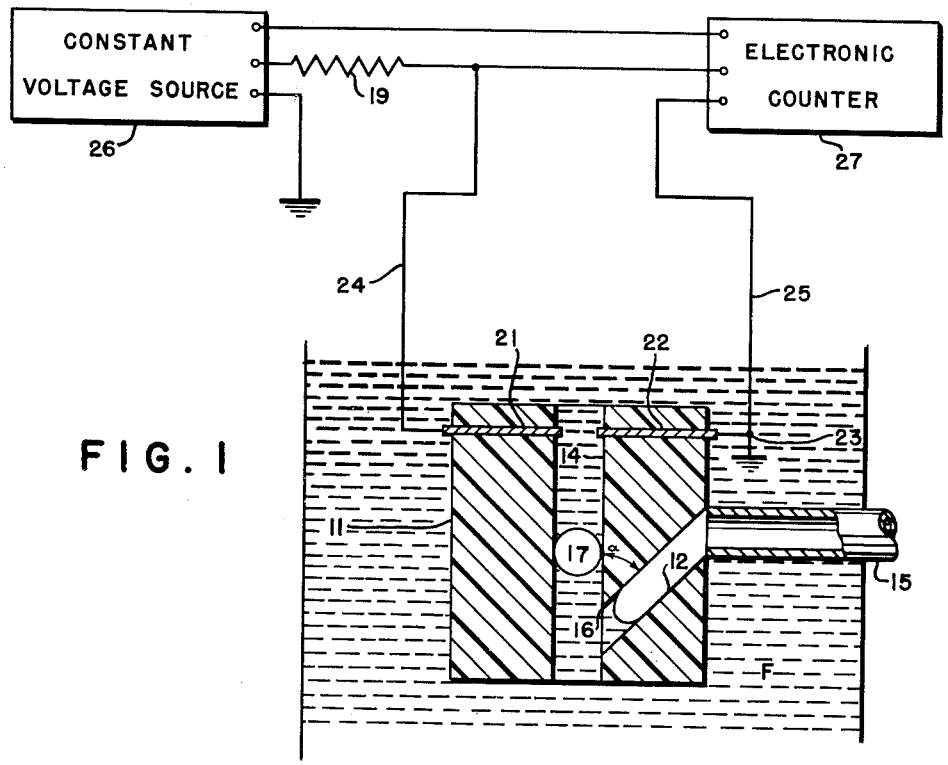

July 20, 1954   W. W. BARTLETT ET AL   2,683,986
ELECTRIC GAS FLOWMETER
Filed May 27, 1952

*INVENTORS*
*WILLIAM W. BARTLETT*
*PHILIP SMOOT*

BY

*Joseph Weingarten*
*ATTORNEY*

Patented July 20, 1954

2,683,986

UNITED STATES PATENT OFFICE 2,683,986
ELECTRIC GAS FLOWMETER
William W. Bartlett, Newport, and Philip Smoot, Portsmouth, R. I., assignors to the United States of America as represented by the Secretary of the Navy Application May 27, 1952, Serial No. 290,376

7 Claims. (Cl. 73—194)

(Granted under Title 35, U. S. Code (1952), sec. 266)

The invention described herein may be manufactured and used by or for the Government of the United States of America for governmental purposes without the payment of any royalties thereon or therefor.

This invention relates to metering the flow of gases and particularly to apparatus for correctly indicating a very slow flow or a very small quantity of gas per unit time.

The measurement of gas flowing through pipes or orifices is a well-known art in so far as the measurements concern considerable quantities of gas to be measured, although the measuring devices are often complicated and expensive. However, commercial flow measurement instruments have a lower limit of the order of 1 to 10 milliliters of gas per minute. Lower rates of gas flow are ordinarily measured by bubbling the gas into an inverted liquid filled transparent container and measuring the time interval to displace a known volume liquid. The present invention is directed to the formation of gas bubbles of uniform size in a liquid medium and to the detection and count of the bubbles individually as they pass through a measuring chamber.

Briefly, the invention contemplates a liquid immersed measuring cell, in which bubbles of uniform size are formed in the liquid medium when gas under pressure in a sloping channel displaces liquid in a downward direction past a sharply angular intersection into a vertical channel. Two insulated electrical leads are brought through the cell wall into the vertical channel forming electrodes exposed to the liquid medium. Alternately one of the leads may be grounded in the liquid medium. Normally the electrodes when immersed in the liquid present a definite electrical resistance depending on the conductivity of the liquid and the dimensions of the cell including the spacing between the electrodes. The electrical resistance of the cell is increased by a factor of about five as a gas bubble passes the electrodes, if the bubble diameter is approximately the same as that of the vertical channel. If the cell is energized from a conventional source of constant potential through a constant impedance, the change of cell resistance during the passage of a gas bubble produces a voltage pulse at the ungrounded electrode. An electrical or electronic counter of conventional form responsive to voltage pulses may then record the total gas flow in terms of number of voltage pulses, each of which represents a bubble. The apparatus can be calibrated by the volumetric method to establish the relationship concerning the volume of gas contained in each bubble.

The principal object of the invention is to provide apparatus for forming gas bubbles of uniform controllable size in a liquid medium and detecting the passage of each individual bubble.

Another object of the invention is to provide a device particularly useful for determining the rate of decomposition of substances which yield a gaseous decomposition product slowly in the course of storage.

Another object of the invention is to provide a device for the accurate, rapid determination of low rates of gas formation in chemical reactions where conventional displacement methods are impractical.

Another object of the invention is to provide a device for determining the rate of leakage of gas from a container through a shut-off valve possessing leakage.

Figure 2:
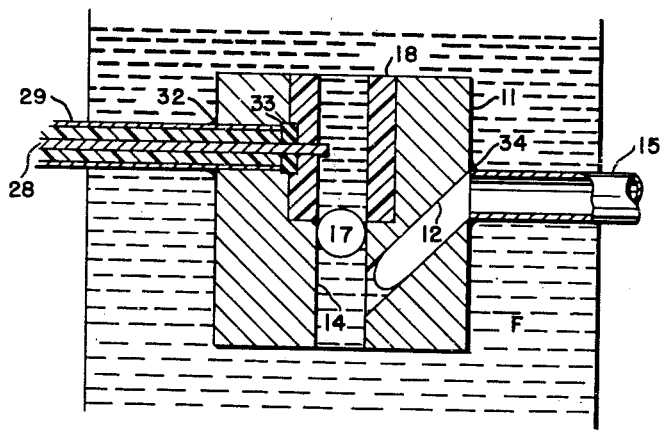

Other objects and many of the attendant advantages of this invention will be readily appreciated as the same becomes better understood by reference to the following detailed description when considered in connection with the accompanying drawings wherein:

Fig. 1 represents one embodiment of the invention in somewhat diagrammatic form in which the metering chamber is shown in sectional elevation; and Fig. 2 is a similar view illustrating a modified construction of the measuring cell.

Fig. 1 of the drawing shows a schematic arrangement of the device. The measuring cell 11 is shown immersed in a liquid medium F held in a suitable container (not shown). The cell body may be made of any suitable rigid electrically insulating material which is unaffected by immersion in a liquid such as water. A vertical channel 14 is bored or otherwise formed to pass completely through the cell body 11. A downwardly sloping channel 12 is bored or otherwise formed starting from a point selected on the outer wall of the cell body to intersect the vertical channel 14 at a predetermined acute angle α at point 16. Pipe 15 is attached to the cell body 11 such that it communicates directly with sloping channel 12. The gas to be measured is introduced under pressure into measuring cell 11 by pipe 15. The gas pressure forces the liquid down in channel 12 and a bubble 17 is formed at point 16. The sharply angular edge of the intersection acting against the buoyancy of the gas divides the gas volume into portions of equal size. The bubble 17 rises and is directed upwardly through vertical channel 14. The two diametrically opposed electrodes 21 and 22 are brought through the wall of cell 11 at points above the point of intersection 16 and extend into vertical channel 14. In order to minimize the effects of electrolytic action on the electrodes, particularly in the event that the energizing potential is taken from a direct current source, the electrode tips extending into vertical channel 14 preferably are made from one of the noble metals such as platinum. The electrical conductivity of the liquid medium may be adjusted by the addition of small quantities of an electrolyte to present a satisfactory value of resistance between electrodes 21 and 22. When, for example, the electrodes are connected so that cell 11 forms a voltage divider with resistor 19 and is energized from voltage source 26, as the bubble 17 passes the electrodes 21 and 22 the electrical resistance of the measuring cell changes thereby producing a voltage pulse and the electronic pulse counter 27 of conventional nature detects the presence of each resulting voltage pulse and counts it. When tap water is the liquid medium the resistance of the cell is normally about 20,000 ohms and increases to approximately 100,000 ohms when a gas bubble passes the electrodes. If tap water is the liquid medium, it takes a bubble approximately 1/30 to 1/20 of a second to pass the electrodes 21 and 22.

Although a particular circuit arrangement has been disclosed for energizing the measuring cell, it is apparent that other circuits for detecting resistance changes, such as a bridge, may be used successfully. It is also to be noted that the constant potential may be obtained from an alternating current source or a direct current source provided an appropriate pulse counter is employed.

The size of the bubble 17 is governed by the respective diameters of the channels and the angle α of the intersection between sloping channel 12 and vertical channel 14. In general successful operation of the device has been obtained when the diameter of the vertical channel 14 is the same or slightly less than the diameter of the sloping channel 12 and adjusted to provide a bubble size between $\frac{1}{10}$ and $\frac{3}{10}$ milliliters.

In Fig. 2 there is shown a second embodiment of the device in which the measuring cell body 11 is constructed of a corrosion resistant metal. The upper portion of the vertical channel 14 is provided with an insulating section 18 recessed into the walls of the cell 11 and having a sufficient wall thickness to provide a vertical channel of uniform bore. Electrode 28 projects through the insulating section 18 into vertical channel 14. Electrode 28 may be made from a suitable length of an insulated single conductor cable having a metallic shield 29 in which conductor 28 forms the electrode. The outer metallic shell 29 may be brazed, soldered or otherwise secured to the body of the cell 11 as indicated by welds at point 32. In this embodiment of the invention the outer metallic shielding 29 of insulated electrode 28 or the liquid container if metallic may serve as a grounded electrode. The insulating section 18 and the measuring cell body 11 are each recessed to form a chamber occupied by a rubber washer 33 which is fitted tightly around the ungrounded electrode 28 to prevent the formation of a continuous liquid path between the metallic shell 29 and electrode 28.

Thus it is seen that the apparatus combines a structure for forming gas bubbles of uniform controlled size in a liquid medium with a measuring cell capable of detecting the passage of each individual bubble so formed. In general we have found that the more acute the angle of intersection between the vertical channel and the sloping channel, the smaller the size of the gas bubble as it passes the angular intersection for a given diameter of vertical and sloping channel bore. The accuracy of bubble formation for a given flow rate has been found to be reproducible within 1 per cent by calibration of the gas flow with liquid displacement. When the bubble size has been controlled by selection of bore of the channels to a volume between $\frac{1}{10}$ and $\frac{3}{10}$ milliliters, the device is capable of detecting the formation of a single bubble of gas whenever it may occur and will distinguish the formation of individual bubbles up to rates of the order of 10 bubbles per second. The solubility of the gas being measured in the liquid medium imposes a limitation on the slowest rate of gas flow which the device will measure. It is apparent that when the flow rate of the gas is less than the rate at which the gas dissolves in the liquid medium, bubble formation does not occur and the device does not detect the flow of gas. The device is found useful for the determination of low rates of gas flow where other methods of measurement are impractical from the point of view of sensitivity or time of measurement.

Obviously many modifications and variations of the present invention are possible in the light of the above teachings. It is therefore to be understood that within the scope of the appended claims the invention may be practiced otherwise than as specifically described.

What is claimed is:

1. Apparatus for the measurement of flow of a gas comprising a bubble forming cell having a vertical channel and a downwardly sloping channel the lower end thereof intersecting said vertical channel in a predetermined acute angle, a liquid filled container enclosing said cell, means for conducting gas under pressure into the upper end of said sloping channel for the formation of gas bubbles of uniform size in said vertical channel by the displacement of liquid at said intersection, and means responsive to the passage of said gas bubbles through said vertical channel to indicate the rate of flow of said gas.

2. Apparatus for the measurement of flow of a gas comprising a bubble forming cell having a vertical channel and a downwardly sloping channel the lower end thereof intersecting said vertical channel in a predetermined acute angle, a liquid filled container enclosing said cell, means for conducting gas under pressure into the upper end of said sloping channel for the formation of gas bubbles of uniform size in said vertical channel by the displacement of liquid at said intersection, a source of voltage, a pair of insulated electrodes inserted through the wall of said cell into said vertical channel, means to energize said electrodes from said voltage source, said electrodes when energized being responsive to the passage of gas bubbles through said vertical channel to produce a voltage pulse for each bubble of gas, and an electrical voltage pulse counter connected with said electrodes to indicate the quantity of gas passing through said cell.

3. Apparatus for the measurement of rate of flow of a gas comprising, a bubble forming cell of electrically insulating material having a vertical channel and a downwardly sloping channel the lower end thereof intersecting said vertical channel in a predetermined acute angle, a container enclosing said cell filled with an electrically conducting liquid, means for conducting gas under pressure into the upper end of said sloping channel for the formation of gas bubbles of uniform size in said vertical channel by the displacement of liquid at said intersection, a source of voltage, a pair of electrodes inserted through the wall of said cell into said vertical channel, means for energizing said electrodes from said voltage source, said electrodes when energized being responsive to the passage of said gas bubbles through said vertical channel to produce a voltage pulse for each bubble of gas, and an electrical voltage pulse counter connected with said electrodes to indicate the quantity of gas passing through said cell.

4. Apparatus for the measurement of rate of flow of a gas comprising, a bubble forming cell of electrically insulating material having a vertical channel and a downwardly sloping channel the lower end thereof intersecting said vertical channel in a predetermined acute angle, a liquid filled container enclosing said cell, said liquid being electrically conducting, means for conducting gas under pressure into the upper end of said sloping channel for the formation of gas bubbles of uniform size in said vertical channel by the displacement of liquid at said intersection, the size of said bubbles being related to the angle of intersection and the bore of said channels, a source of voltage, a first electrode inserted through the wall of said cell into said vertical channel, a second electrode inserted through the wall of said cell at a point diametrically opposed to said first electrode, means for energizing said electrodes from said voltage source, said electrodes when energized being responsive to the passage of said gas bubbles through said vertical channel to produce a voltage pulse for each bubble of gas, and an electrical voltage pulse counter connected with said electrodes to indicate the quantity of gas passing through said cell.

5. In volumetric gas flow measuring apparatus of the bubbling type in which the flow of gas being measured is caused to pass in separate volumes through a body of liquid, a bubble forming cell comprising, a block of rigid material having a vertical channel passing therethrough and a downwardly sloping channel the lower end thereof intersecting said vertical channel at an acute angle, and a gas inlet tube fastened to said block and communicating with the upper end of said sloping channel for introducing gas into said cell.

6. In volumetric gas flow measuring apparatus of the bubbling type in which the flow of gas being measured is caused to pass in separate volumes through a body of liquid, a bubble forming cell comprising, a block of electrically insulating material having a vertical channel of predetermined diameter of bore passing therethrough and a downwardly sloping channel of predetermined diameter of bore the lower end thereof intersecting said vertical channel at an acute angle to form a sharply angular intersection, a gas inlet tube fastened to said block and communicating with the upper end of said sloping channel for introducing gas into said cell, whereby gas bubbles of uniform size related to angle of intersection and bore of channels are formed in said vertical channel by displacement of liquid at said intersection, and a pair of electrodes inserted through the wall of said cell into said vertical channel to detect electrically the passage of gas bubbles.

7. In volumetric gas flow measuring apparatus of the bubbling type in which the flow of gas being measured is caused to pass in separate volumes through a body of liquid, a bubble forming cell comprising, a solid corrosion resistant metallic block having a vertical channel passing through said block and a downwardly sloping channel therein, said vertical channel and said sloping channel intersecting at a predetermined acute angle, said vertical channel having an enlarged section above said intersection, a gas inlet tube connected with said block and communicating with the upper end of said sloping channel, a hollow insulating sleeve fitted in said enlarged section, said sleeve having a wall thickness to form a vertical channel of uniform bore, an electrode inserted through the wall of said cell and through the wall of said sleeve into said vertical channel, and means to insulate said electrode from the metallic wall of said cell, whereby the wall of said cell and said electrode are adapted electrically to detect the presence of bubbles within the vertical channel of said cell.

References Cited in the file of this patent

UNITED STATES PATENTS

| Number | Name | Date |
|---|---|---|
| 2,333,791 | Hutchison | Nov. 9, 1943 |
| 2,340,751 | Holmes | Feb. 1, 1944 |
| 2,371,995 | Holmes et al. | Mar. 20, 1945 |
| 2,594,668 | Mannal | Apr. 29, 1952 |